United States Patent
Hineno et al.

(10) Patent No.: US 9,086,589 B2
(45) Date of Patent: Jul. 21, 2015

(54) LIQUID CRYSTAL DISPLAY DEVICE

(75) Inventors: Mitsuru Hineno, Osaka (JP);
Masanobu Okano, Osaka (JP)

(73) Assignee: SHARP KABUSHIKI KAISHA,
Osaka-shi (JP)

( * ) Notice: Subject to any disclaimer, the term of this patent is extended or adjusted under 35 U.S.C. 154(b) by 431 days.

(21) Appl. No.: 13/809,113

(22) PCT Filed: Apr. 18, 2011

(86) PCT No.: PCT/JP2011/059507
§ 371 (c)(1),
(2), (4) Date: Feb. 20, 2013

(87) PCT Pub. No.: WO2012/005043
PCT Pub. Date: Jan. 12, 2012

(65) Prior Publication Data
US 2013/0148056 A1    Jun. 13, 2013

(30) Foreign Application Priority Data

Jul. 8, 2010  (JP) .................................. 2010-155736

(51) Int. Cl.
*G02F 1/1335* (2006.01)
*F21V 8/00* (2006.01)

(52) U.S. Cl.
CPC ........ *G02F 1/133524* (2013.01); *G02B 6/0038* (2013.01); *G02B 6/0043* (2013.01); *G02F 1/133615* (2013.01); *G02B 6/0031* (2013.01); *G02B 6/0061* (2013.01); *G02F 2001/133601* (2013.01)

(58) Field of Classification Search
CPC ............................................... G02F 1/133524
See application file for complete search history.

(56) References Cited

U.S. PATENT DOCUMENTS

| 2006/0039670 | A1 | 2/2006 | Feng et al. |
| 2006/0164864 | A1 | 7/2006 | Arihara |
| 2009/0268484 | A1 | 10/2009 | Kim et al. |

FOREIGN PATENT DOCUMENTS

| CN | 1737660 | 2/2006 |
| CN | 101566289 | 10/2009 |
| JP | 8-327807 | 12/1996 |
| JP | 2001-210122 | 8/2001 |
| JP | 2005-108512 | 4/2005 |
| JP | 2006-156279 | 6/2006 |
| JP | 2007-27144 | 2/2007 |
| JP | 2009-31445 | 2/2009 |
| JP | 2009-48939 | 3/2009 |
| TW | M245446 | 10/2004 |
| TW | 200925516 | 6/2009 |

OTHER PUBLICATIONS

International Search Report mailed May 17, 2011, directed to International Application No. PCT/JP2011/059507; 4 pages.

*Primary Examiner* — Timothy L Rude
(74) *Attorney, Agent, or Firm* — Morrison & Foerster LLP (57) ABSTRACT

Provided is a liquid crystal display device that can reduce costs while preventing moving image blurring. The device includes a liquid crystal panel and a backlight device. The backlight device includes a rectangular light guide plate 10 in plan view, and a light source unit emitting light toward a light incident surface corresponding to a side surface of the light guide plate. The light source unit is configured by a plurality of light source blocks arranged in a Y direction. The light guide plate 10 includes a groove structure 32 for taking out light upward on its front surface opposed to a back surface of the liquid crystal panel, and a dot pattern 31 for scattering light on its back surface. The groove structure 32 has a plurality of stripe-like grooves extending in an X direction, wherein a ridge extending in the X direction is formed at a portion sandwiched between the two adjacent grooves.

12 Claims, 12 Drawing Sheets

LIQUID CRYSTAL DISPLAY DEVICE

REFERENCE TO RELATED APPLICATIONS

This application is a national stage application under 35 USC 371 of International Application No. PCT/JP2011/059507, filed Apr. 18, 2011, which claims the priority of Japanese Patent Application No. 2010-155736, filed July 8, 2010, the entire contents of which are incorporated herein by reference.

FIELD OF THE INVENTION

The present invention relates to a liquid crystal display device.

BACKGROUND OF THE INVENTION

With the progress of miniaturization and energy saving of a liquid crystal display device in recent years, its market continues to expand.

In the case of displaying a still image on a liquid crystal display device, any practical problem hardly occurs. However, in the case of displaying a moving image, the displayed image may leave traces (moving image blurring). For example, when a white ball moves on a black background screen, a grey shadow appears behind the white ball.

In Patent Document 1 listed below, a high-contrast display device in which no moving image blurring occurs is realized by dividing a light guide plate constituting backlight as a light source into a plurality of blocks, and repeatedly lighting on/off the divided blocks in synchronization with a video signal.

Patent Document 1: Japanese Unexamined Patent Application Publication No. 2001-210122

Patent Document 2: Japanese Unexamined Patent Application Publication No. 2009-031445

SUMMARY OF THE INVENTION

With the configuration described in Patent Document 1, a high-performance video display is realized by dividing a light guide plate into a plurality of blocks and providing an air layer or a reflective layer between the adjacent blocks to form a linear light source. However, since a high manufacturing cost is required to realize this configuration, a low-cost optical control technique achieving equivalent performance has been demanded.

In an example, in order to form a single light guide plate to cut costs, a groove is formed in a back surface of the light guide plate, that is, a surface on the opposite side of a liquid crystal panel, along a boundary with a lighting area so as not to diffuse light entering from a side surface of the light guide plate into the adjacent lighting area (refer to Patent Document 2). In this conventional example, the groove does not reach a front surface of the light guide plate to constitute a single plate.

However, in this case, light reflected on the groove is emitted to the front surface of the light guide plate (liquid crystal panel side). As a result, light appears along the groove as a bright line and generates high contrast, thereby disadvantageously lowering the quality of image around the display screen.

In view of the above-mentioned problems, an object of the present invention is to provide a liquid crystal display device that can reduce costs while preventing moving image blurring.

In order to achieve the above object, a liquid crystal display device according to the present invention is characterized by including:

a liquid crystal panel; and a backlight device including a rectangular light guide plate in plan view, and a light source unit emitting light toward a light incident surface corresponding to a side surface of the light guide plate, the light source unit being configured by a plurality of light source blocks arranged in a first direction parallel to the light incident surface and perpendicular to the light guide plate in a thickness direction, wherein the light guide plate includes a groove structure for taking out light upward on its front surface opposed to a back surface of the liquid crystal panel, and a dot pattern for scattering light on its back surface, and the groove structure has a plurality of stripe-like grooves extending in a second direction perpendicular to the light incident surface of the light guide plate, and a ridge extending in the second direction is formed at a portion sandwiched between the two adjacent grooves.

The groove structure is preferably made of the same transparent material as a light guide plate.

The liquid crystal display device has another characteristic that a valley of each groove is positioned at the same level as or above a side surface of the light source unit, which is opposed to the light incident surface of the light guide plate.

The liquid crystal display device has another characteristic that the dot pattern is distributed more densely with increasing distance from the light incident surface of the light guide plate along the second direction.

The liquid crystal display device has another characteristic that a directivity characteristic control member for controlling a directivity angle of light incident onto the light guide plate from the light source blocks is provided between the light source blocks and the light guide plate, and the directivity characteristic control member is formed by continuously arranging a light transmission part and a light shielding part alternately in the first direction.

In addition to the above characteristics, the directivity characteristic control member may be formed so as to continuously arrange the light transmission part and the light shielding part alternately in the first direction in a first region closer to the light source blocks than a predetermined position, and so as to be optically transparent as a whole in a second region closer to the light guide plate than the predetermined position.

Furthermore, the liquid crystal display device has another characteristic that the light source block has a plurality of LED elements arranged in the first direction, and the directivity characteristic control member has a pitch between the light shielding parts that is smaller than a pitch between the LED elements.

Furthermore, the directivity characteristic control member may have a pitch between the light shielding parts that becomes smaller with decreasing distance from the light source blocks along the second direction.

Furthermore, the liquid crystal display device has another characteristic that the light source block has a plurality of LED elements arranged in the first direction, and the plurality of LED elements are integrally sealed together with a sealing body having optical transparency, and the sealing body has a plurality of stripe-like grooves extending in parallel to the thickness direction of the light guide plate, on a surface opposed to the light incident surface of the light guide plate.

The liquid crystal display device has another characteristic that the light source block includes a rod-like light-source light guide body arranged by having one side surface opposed to the light incident surface of the light guide plate, and a pair of LED light sources arranged with the light-source light guide body interposed therebetween, so as to be opposed to two side surfaces of the light-source light guide body perpendicular to the side surface of the light-source light guide body opposed to the light incident surface of the light guide plate, and the light-source light guide body has a plurality of stripe-like grooves extending in parallel to the thickness direction of the light guide plate, on the surface opposed to the light incident surface of the light guide plate.

The liquid crystal display device has another characteristic that a cross section in the first direction of the groove of the light guide plate has a smallest width at a valley thereof.

The liquid crystal display device has another characteristic that an angle formed by two inclined surfaces forming the groove is 88° or more and 98° or less.

The liquid crystal display device has another characteristic that the second direction corresponds to a scanning direction of the liquid crystal panel.

The liquid crystal display device has another characteristic that the light source unit includes three or more light source blocks arranged in the first direction.

In a liquid crystal display device according to the present invention, even when light emitted from a predetermined light source block reaches to the display area adjacent to the display area corresponding to the light source block in the light guide plate, the light is hardly extracted upward due to the groove in the front surface of the light guide plate. For this reason, local lighting can be achieved without generating crosstalk between adjacent display areas.

Thus, in the case where, in order to light off the display area in which data writing is not completed, the light source block corresponding to the display area is lighted off, light from the adjacent lighted light source block is not projected to the display area. Accordingly, since the display area in which data writing is not completed is not visually recognized, a clear moving image without moving image blurring can be displayed.

Further, irregular brightness does not occur in the vicinity of the light incident surface of the light guide plate, thereby enabling uniform lighting on the front surface of the light guide plate, and display of an image without irregular brightness.

Moreover, since the light guide plate is formed of a single plate, it is not necessary to adjust positional relationship between divided light guide plates as the conventional technique, thereby simplifying a manufacturing process and reducing manufacturing cost. In addition, light entered into the light guide plate will not be lost in an air layer between the divided light guide plates.

DETAILED DESCRIPTION OF THE INVENTION

Figure 1A:
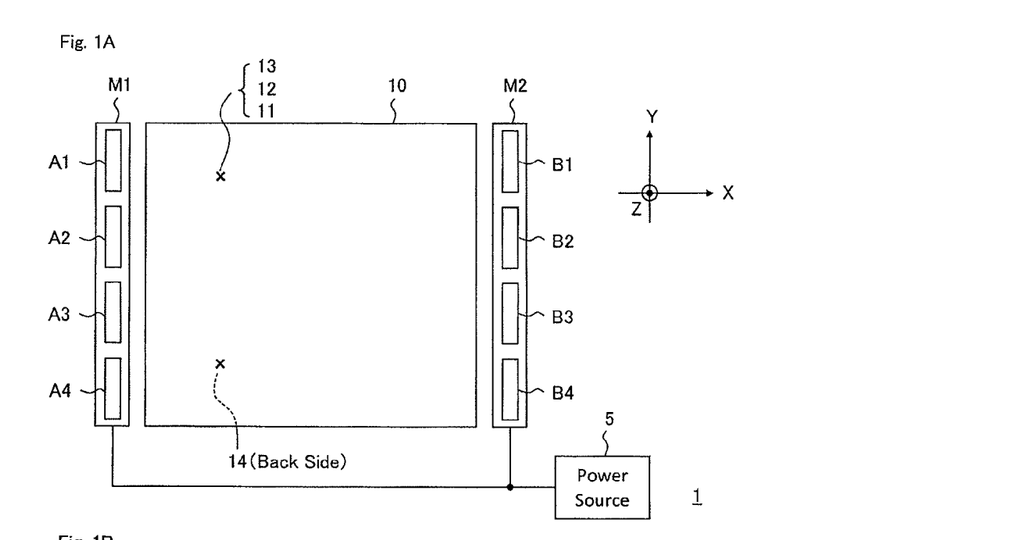
FIG. 1 is a schematic view of a liquid crystal display device according to the present invention.
Figure 1B:
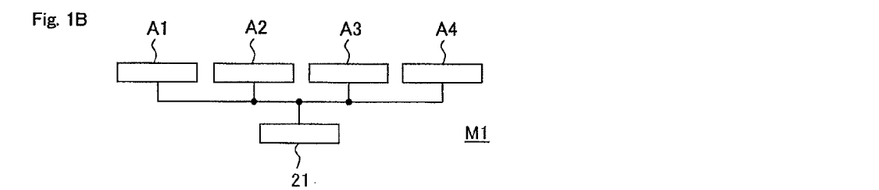
Figure 1C:
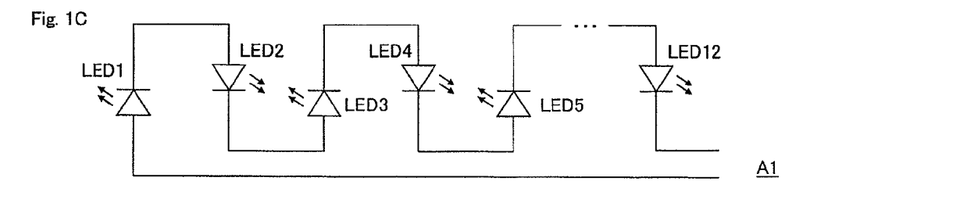
Figure 1D:
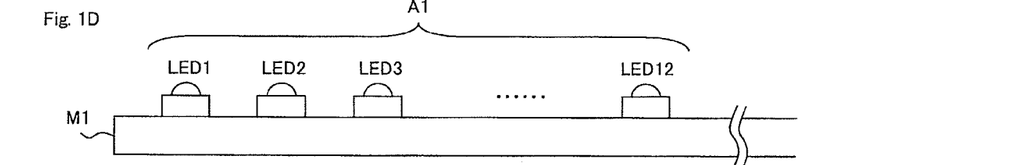
Figure 2:
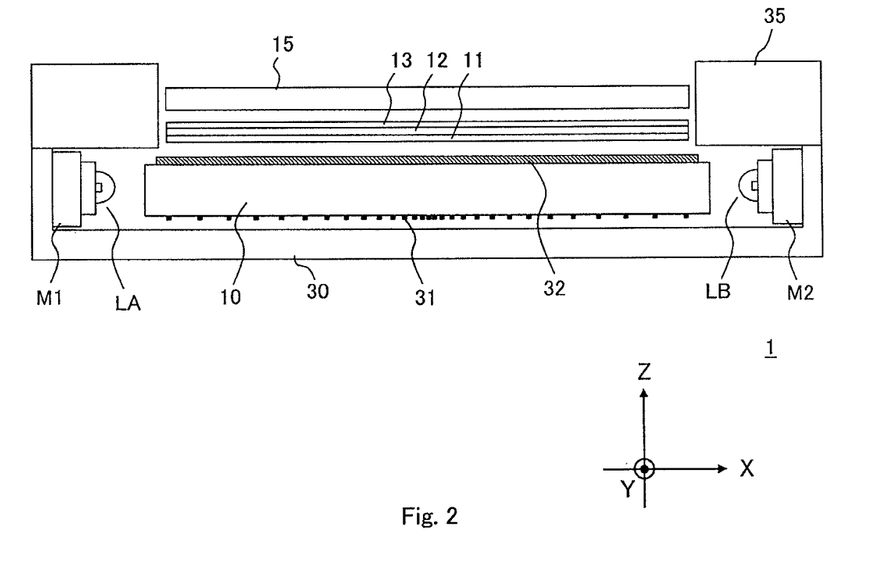
FIG. 2 is a schematic sectional view of the liquid crystal display device according to the present invention.

FIGS. 1A to 1D are schematic configuration views of a liquid crystal display device according to the present invention, where FIG. 1A is a plan view, and FIGS. 1B to 1D show some extracted components (except for a liquid crystal panel). FIG. 2 is a schematic sectional view of the liquid crystal display device including a backlight device.

In a liquid crystal display device 1, a rectangular light guide plate 10 is installed in a box-like housing 30 having an opened front surface, and LED boards M1 and M2 are provided on both side surfaces across the light guide plate 10 (in one direction). These LED boards are electrically connected to a power source 5 and a control circuit (not shown) through a connector 21. The light guide plate 10 is made of an organic resin such as an acrylic resin and a polycarbonate resin, or a glass board.

In the following, for convenience of description, in FIG. 1A, a direction from the left to the right on the plane of drawing is defined as the X-direction, a direction from a lower side to an upper side on the plane of drawing is defined as the Y-direction, and a direction from a back surface side to a front surface side of the plane of drawing, which is perpendicular to the plane of drawing, is defined as the Z-direction. The Y-direction corresponds to a "first direction", and the X-direction corresponds to a "second direction".

A plurality of optical sheets (a diffusion sheet 11, a prism sheet 12, and a polarized light reflective sheet 13) is stacked on a front surface (liquid crystal panel side) of the light guide plate, and a liquid crystal panel 15 is mounted thereon. On the other hand, a reflective sheet 14 is arranged on a back surface and on side surfaces where no LED board is arranged (for convenience of drawing, only reference numerals are shown in FIG. 1A).

On the strip-like LED boards M1 and M2, a plurality of point light sources (LED light sources) are mounted in a longitudinal direction (Y-direction) of the boards at regular intervals. In this embodiment, 12 adjacent point light sources aligned from an end of each LED board constitute one light source block, and both the boards M1 and M2 each have four light source blocks. As shown in FIG. 1A, the light source blocks A1, A2, A3, and A4 are mounted on the LED board M1, and the light source blocks B1, B2, B3, and B4 are mounted on the LED board M2. Note that the number of light source blocks and the number of LED elements on each light source block are not limited to the number in this embodiment.

The light source blocks (A1 to A4, B1 to B4) each refer to a group of a plurality of point light sources, which corresponds to each lighting areas of the light guide plate 10 among light source modules constituted by mounting the plurality of point light sources at regular intervals in the longitudinal direction (Y-direction) of the LED boards (M1, M2). For example, the light source blocks A1 and A2 light different areas of the light guide plate 10.

As shown in FIG. 1C, each of the light source blocks is configured by a plurality of serially connected LED elements (corresponding to the above-mentioned point light sources). FIG. 1D is a schematic view showing a state where the LED elements are arranged on the LED board M1 when viewed from above in FIG. 1A.

As shown in FIG. 1B, each of the light source blocks is electrically connected to the power source 5 via the connector 21. That is, the light source blocks are connected in parallel, and the LED elements in each light source block are serially connected. Thus, the point light sources in the light source block are simultaneously driven, and the light source blocks can be independently driven.

With the configuration shown in FIG. 1A, a front surface area of the light guide plate 10 forms one lighting area. This area is a region sandwiched between a pair of light source blocks (A1 and B1, A2 and B2, . . . ) opposed to each other across the light guide plate 10. Then, by lighting each pair of light source blocks, the corresponding front surface area of the light guide plate emits light. In the case where four pairs of light source blocks are arranged as shown in FIG. 1A, the front surface area is divided into four areas.

The pair of LED elements shown in FIG. 2 correspond to the LED elements existing in the pair of light source blocks opposed to each other across the light guide plate 10. In FIG. 2, the point light source formed of the LED element mounted on the LED board M1 is denoted by a reference symbol LA, and the point light source formed of the LED element mounted on the LED board M2 is denoted by reference symbol LB. The boards M1 and M2 are covered with a frame 35, thereby preventing light emitted from the light sources from directly dispersing upward (Z-direction).

Figure 3A:
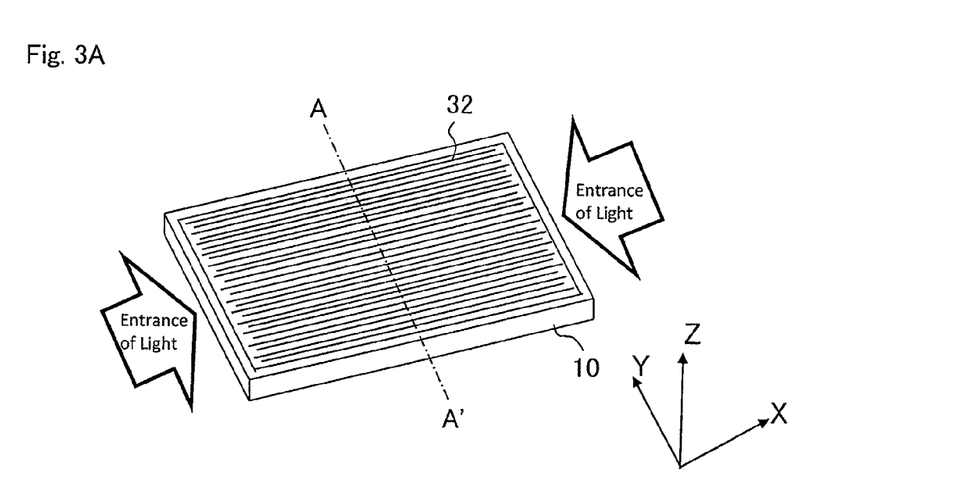
FIG. 3 is a schematic view of a light guide plate.
Figure 3B:
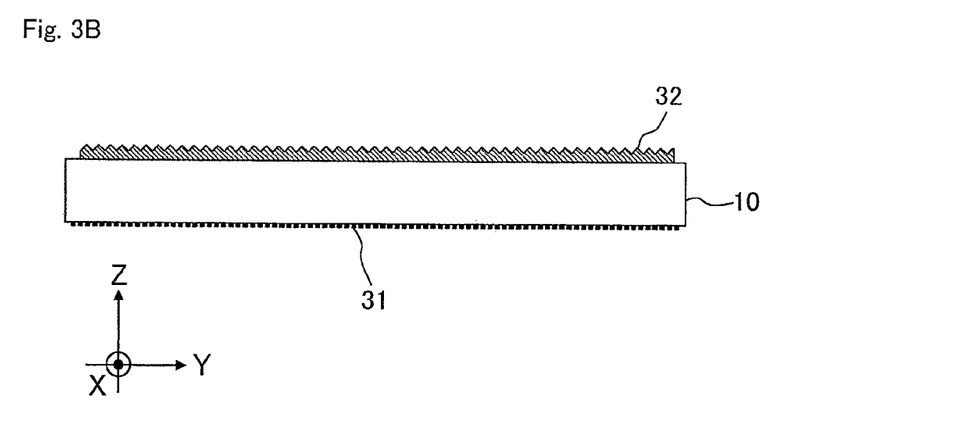

The light guide plate 10 has a groove structure 32 on the front surface side (liquid crystal panel 15 side) and light diffusion dot patterns 31 on the back surface side. FIGS. 3A and 3B are schematic views of the light guide plate 10. FIG. 3A is a perspective view, and FIG. 3B is a sectional view taken along line A-A' which is parallel to the Y-direction in FIG. 3A. The groove structure 32 refers to a structure having V-shaped grooves formed of continuously formed concave portions and convex portions.

In the front surface of the light guide plate 10, the groove structure 32 is provided and thus, a number of grooves extending in parallel to a light incident direction are formed. Thereby, light entered into the groove structure 32 within a predetermined angle range of light incident to the light guide plate 10 can be emitted in the upward direction of the light guide plate 10 (Z-direction).

The groove structure 32 can be shaped such that, for example, as shown in FIG. 3B, a plurality of prisms each having a triangular cross section parallel to a light incident surface of the light guide plate 10 (cross section taken along A-A') are continuously formed. It is preferred that an angle of a vertex of each prism falls within a range of 88° to 98° (preferably, 93°). It is preferred that the height of the vertexes (ridges) of the prisms is constant in the light guide plate.

Each valley of the groove structure 32 is designed to be positioned at the same level as or above the periphery of the light-emitting surface of the point light source formed of the LED element. More specifically, it is preferred that each valley is positioned so that the valley does not cover the periphery of a light-emitting pattern of light emitted from the point light source, which is projected on the light incident surface of the light guide plate (for example, a light-emitting region defined according to a desired defined amount, such as ½ of the luminous intensity in the light axis direction or smaller). Such a shallow groove structure can solve problems that light leaks to the grooves and is extracted upward to emphasize light emission as a bright line, and that part of light from the LED element is not entered into the light guide plate, causing optical loss. It is preferred that the height of the valleys (depth of the grooves) is constant in the light guide plate.

As a matter of course, the shape of the groove structure 32 is not limited to the shape shown in FIG. 3B, and may be a shape formed by continuously arranging upwardly-protruding curved portions (so-called lenticular structure and the like) as long as light entering into the light guide plate 10 can be guided upward. That is, any structure having a plurality of grooves extending in parallel to the light incident direction maybe adopted.

The groove structure 32 is made of the same material as the light guide plate 10. The groove structure 32 can be formed according to various methods. For example, the groove structure can be formed by applying uncured resin to a front surface of a flat plate-like light guide plate, the uncured resin being made of the same material as the light guide plate, and then, imprinting (thermally curing or optically curing) the plate by use of a stamper, or can be formed integral with the light guide plate by extrusion molding, or can be formed by processing the front surface of the light guide plate according to a printing method using laser processing. In forming the groove structure by imprinting, an interface between a portion including the groove structure 32 formed by application of resin and curing and a portion of the light guide plate 10 (main unit) needs to be an optically continuous interface without refraction and reflection.

The plurality of dot patterns 31 are distributed on the back surface of the light guide plate 10 such that light entered into the light guide plate are uniformly emitted in the light guide plate. The distribution density becomes higher as the dot patterns are away from the light incident surface in the light incident direction (X-direction). In other words, the dot pattern distribution density is high in the vicinity of the center of the light guide plate 10, which is farthest from the side surface of the light guide plate 10 near the point light sources in the light incident direction. The dot patterns 31 are arranged at a constant distribution density in the Y-direction (longitudinal direction of the light source blocks) perpendicular to the light incident direction.

The dot patterns 31 have a dot shape, thereby scattering light in the light guide plate 10. With this function, part of light entered into the light guide plate 10 is reflected at the bottom surface by the dot patterns 31 and guided toward the display surface. Then, the light is extracted above the light guide plate 10, thereby making the in-plane brightness uniform. The dot patterns 31 may be formed by applying light scattering paint, or by processing (laser-processing) the back surface of the light guide plate 10 to be convex.

Figure 4A:
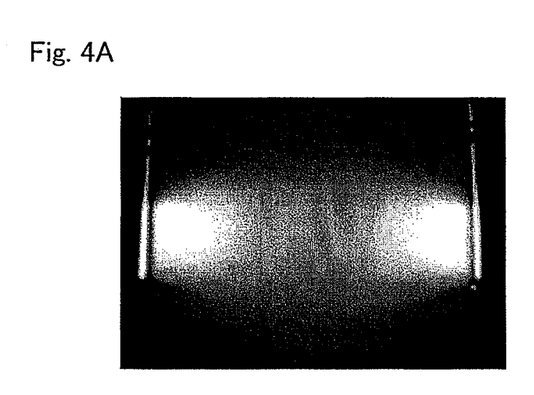
FIG. 4 is a photograph showing a state where light is entered into the light guide plate.
Figure 4B:
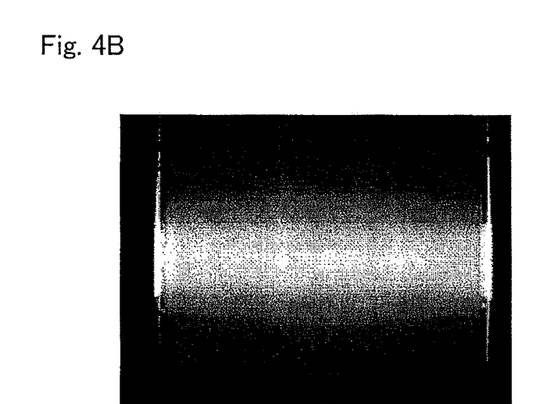

FIGS. 4A and 4B are photographs showing a state where light is entered from the light source blocks into the light guide plate 10 having the groove structure 32 on its front surface and the dot patterns 31 on its back surface, in comparison with a normal light guide plate. FIG. 4A shows a state where light is entered into the normal light guide plate, and FIG. 4B shows a state where light is entered into the light guide plate 10.

When the state in FIG. 4B is compared with the state in FIG. 4A, lighting in the lighting area can be achieved and the amount of light entering into adjacent areas can be greatly reduced.

Figure 5A:
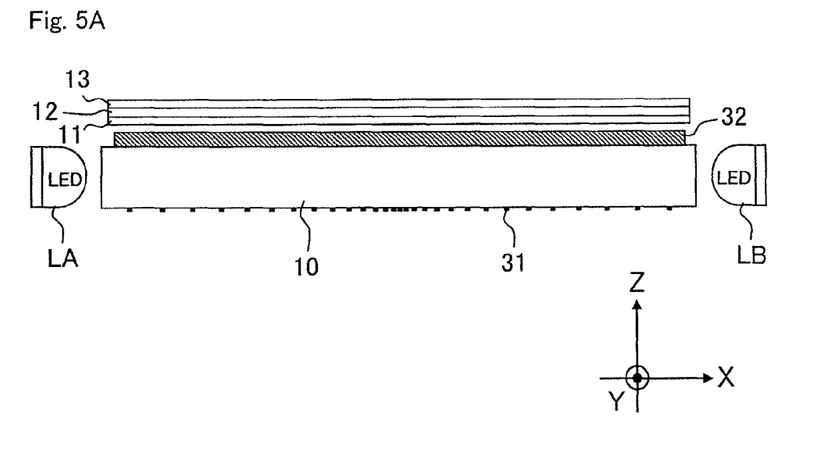
FIG. 5 is a schematic view showing a positional relationship among the light guide plate, a point light source, and an optical sheet group.
Figure 5B:
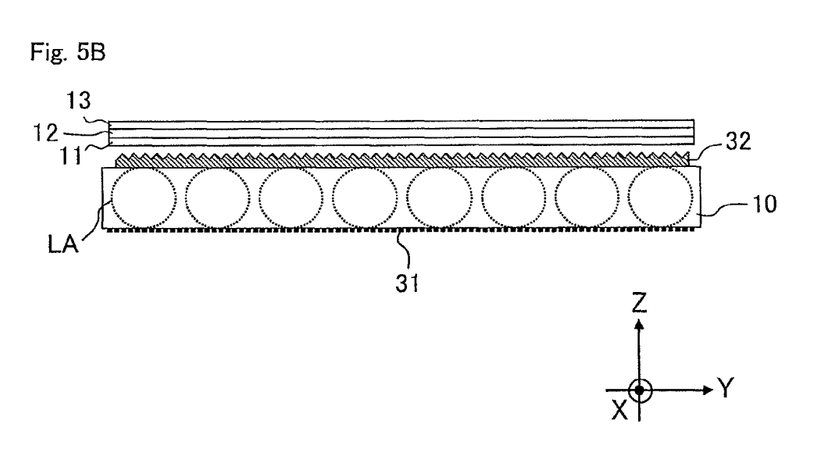
Figure 6A:
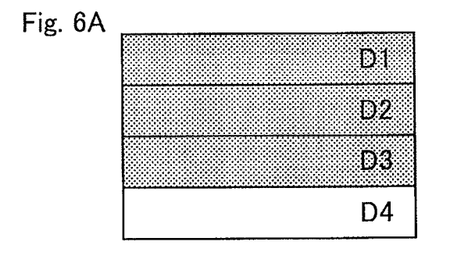
FIG. 6 is a schematic view showing an example of a driving method.
Figure 6B:
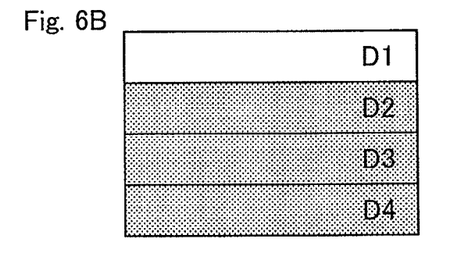
Figure 6C:
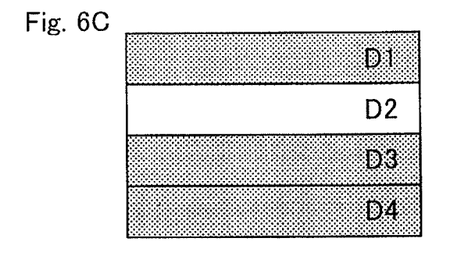
Figure 6D:
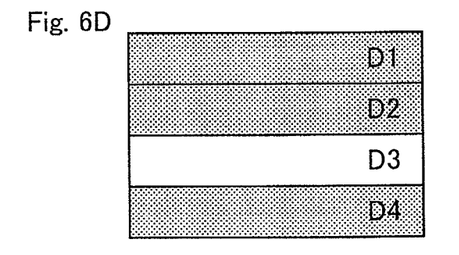

FIGS. 5A and 5B are schematic views showing positional relationship among the light guide plate 10, the point light sources (LA, LB), and the optical sheet group (11 to 13). FIG. 5A is a schematic view of FIG. 3A when viewed in the Y-direction, and FIG. 5B is a schematic view of FIG. 3A when viewed in the light incident direction (X-direction).

The point light sources (LA, LB) are each formed by mounting a blue LED chip on the LED board (M1 M2) and sealing the periphery of the blue LED chip with a dome-like sealing body. The sealing body has a two-layered structure including an inner hull layer that covers the LED chip and is made of optically transparent resin containing a phosphor, and an outer hull layer that covers the inner hull layer and is made of optically transparent resin containing no phosphor (not shown).

Primary light (blue light) emitted from the blue LED chip is absorbed by the phosphor, secondary light having a longer wavelength than the primary light is emitted, and mixed light of the primary light and the secondary light is emitted as white light.

Since the point light sources improve the connection efficiency with the light incident surface of the light guide plate 10 as well as prevent light entered into the light guide plate 10 from diffusing in the Y-direction and extending to the adjacent lighting areas in the light guide plate 10, the directivity angle of light projected to the light incident surface is preferably small. For example, the directivity angle is preferably, 90° or smaller, more preferably 75° or smaller, and still preferably 45° or smaller. As one example, in the case where the directivity angle of each point light sources is set to 120°, given that the distance from the point light source to the light guide plate 10 is 1 mm, the thickness of the light guide plate 10 is 4 mm, and the height of the sealing body is 1.6 mm, the light source block having the directivity angle of 75° can be realized.

The "directivity angle" herein refers to an angle range in which the luminous intensity of light emitted from the point light source is 50% or higher, when luminous intensity in an optical axis direction passing the center of the point light source is 100%.

To realize such a narrow directivity characteristic, it is preferred that, in the point light source (LED light source), a space is provided around the sealing body and the sealing body is covered with a reflective member, or the sealing body is made rectangular or lenticular.

One cause for visible moving image blurring in the conventional configuration is that it takes a certain amount of time after voltage application until arrival at a target transmittance. That is, since the transmittance of liquid crystal on the pixel does not arrive at the target transmittance immediately after voltage application, the viewer of the liquid crystal display device can observe the state during change of transmittance, thereby visually recognizing the moving image blurring.

The liquid crystal display device in this embodiment can change the lighting area according to the lighted pair of light source blocks. Thus, for pixels in the state during change of transmittance, the pair of light source blocks that light the lighting area serving as backlight for lighting the display area including the pixel positions are turned off, and for pixels whose transmittance arrives at the target value, the pair of light source blocks that light the lighting area serving as backlight for lighting the display area including the pixel positions are turned on. Thereby, the state during change of transmittance cannot be observed by the viewer, preventing moving image blurring.

An example of a method of driving the liquid crystal display device in this embodiment for preventing moving image blurring will be described with reference to FIGS. 6A to 6D and FIGS. 7A to 7C. For convenience of description, a display area in the liquid crystal panel 15, in which irradiated light from a lighting area D1 is used as backlight, is represented as d1. Similarly, a display area corresponding to a lighting area D2 is represented as d2, a display area corresponding to a lighting area D3 is represented as d3, and a display area corresponding to a lighting area D4 is represented as d4.

According to the driving method in FIGS. 6A to 6D, light is entered only into the lighting area for irradiating the display area to be written in a next turn of the display area being currently written, and light is not entered into other lighting areas. The operation of continuously lighting the same lighting area is referred to as "turn". For example, in the case where pixels in the display area d3 are currently being written, by lighting on only the fourth block pair (A4, B4) to light the lighting area D4, the display area d4 in the liquid crystal panel 15 using irradiated light from the lighting area D4 as backlight. Other block pairs are lighted off (a).

Then, when writing to each line in the display area D3 is finished, the fourth block pair (A4, B4) is lighted off, and the first block pair (A1, B1) is lighted on to display the display area d1 (b). Hereinafter, the display area is switched in the similar manner.

According to this driving method, the transmittance of each pixel in the displayed to be written only needs to be stabilized by the time three turns are finished. In other words, even when the display area D4 is changed to dark and the display area D1 is changed to bright immediately after the writing operation to each line in the display area D3 is finished, given that time during which the same lighting area is lighted is one turn, time for three turns has passed since writing in each pixel in the display area D1 and therefore, the transmittance sufficiently becomes stabilized and a stable image is displayed in the display area D1.

Figure 7A:
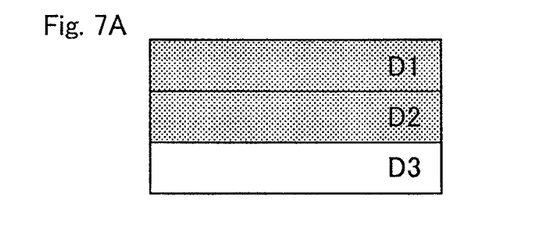
FIG. 7 is a schematic view showing another example of a driving method.
Figure 7B:
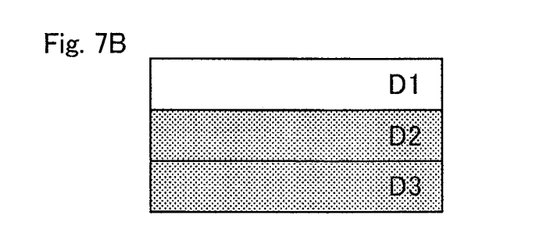
Figure 7C:
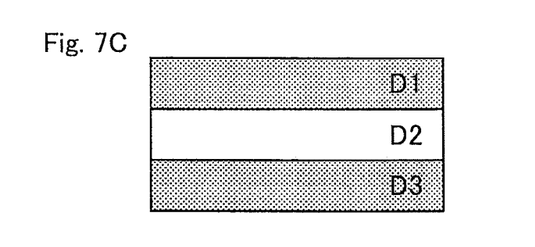

In the case where the light source part includes three pairs of light source blocks (A1 and B1, A2 and B2, A3 and B3), as shown in FIGS. 7A to 7C, the region of the light guide plate 10 may be divided into three lighting areas, and the same operation may be performed. In this case, even when the display area D3 is changed to dark and the display area D1 is changed to bright immediately after the writing operation to each line in the display area D2 is finished, at least time for two turns has passed since writing in each pixel in the display area D1 and therefore, a stable image is displayed in the display area D1.

By performing such control, the backlight is turned off at the place where the transmittance is changing, and thus, moving image blurring is solved and an excellent image can be displayed. The driving method is not limited to those shown in FIGS. 6A to 6D and FIGS. 7A to 7C, and other methods may be employed.

To prevent moving image blurring, between a display image in a previous frame and a display image in a subsequent frame, the transmittance of the whole surface of the liquid crystal panel is set to 0%, or a black display image is inserted by lighting off the point light sources of all display areas. However, these methods lower the brightness of display at this moment.

According to the method in this embodiment, since some display areas are lighted off, the brightness is inevitably lowered as compared to full lighting. However, the method can improve lowering of brightness as compared to the method of inserting the black display image.

Figure 8A:
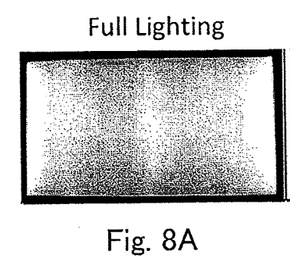
FIG. 8 is a photograph showing lighting states in typical lighting modes.
Figure 8B:
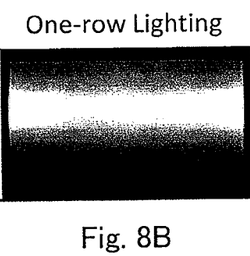
Figure 8C:
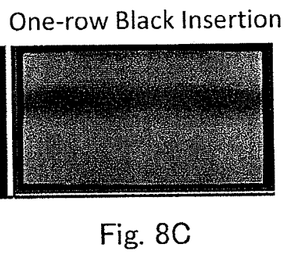

FIGS. 8A to 8C show lighting states in typical lighting modes. FIG. 8A corresponds to a full lighting mode (all light source blocks are lighted on), FIG. 8B corresponds to a one-row lighting mode (only one pair of light source blocks is lighted on), and FIG. 8C corresponds to a one-row black insertion mode (only one pair of light source blocks is lighted off and other pairs are lighted on).

As is apparent from FIG. 8A, in the full lighting mode, all areas are lighted without bright and dark lines. Further, as is apparent from FIG. 8B, in the one-row lighting mode, lighting including no bright and dark lines can be achieved without largely leaking light to adjacent lighting areas. As is apparent from FIG. 8C, in the one-row black insertion mode, lighting including no bright and dark lines can be achieved without largely leaking light from surrounding lighting areas to the turned-off adjacent areas.

As described above, in this embodiment, by waiting for the transmittance of the liquid crystal panel at a predetermined pixel line to become a predetermined value, and lighting the area including the pixel line, area lighting control capable of eliminating moving image blurring can be achieved. Such control can display a moving image without moving image blurring and a still image without bright line/dark line while suppressing lowering of brightness as much as possible. In addition, since it is not necessary to provide an air layer or a reflective layer between adjacent blocks, large rise of manufacturing cost is not caused.

As a comparison example for this embodiment, in the case of using a light guide plate (for convenience, described as "light guide plate α") having the groove structure 32 on its bottom surface and the dot patterns 31 on the display surface, in place of the light guide plate 10 in this embodiment, when a predetermined area is lighted, due to interference of light emitted from adjacent point light sources, a bright/dark pattern is generated in the vicinity of the light incident surface along the light incident surface of the light guide plate a when viewed from the display surface. Although the bright/dark pattern can be somewhat mitigated by light scattering effect of the dot patterns 31, the bright/dark pattern cannot be completely obscured as in this embodiment. To completely obscure the bright/dark pattern, it is necessary to cover the vicinity of the light incident surface of the light guide plate α with a frame, hindering large-screen display.

Although the bright/dark pattern can be addressed by making the interval between the point light sources smaller, the number of point light sources used in the entire backlight device increases, leading to a disadvantage in terms of costs.

With the configuration in this embodiment, the groove structure 32 of the light guide plate 10 serves to cancel brightness distribution between the adjacent light sources. Out of incident light from the light source, the amount of light extracted above the light guide plate 10 is suppressed at a place where the center of the light source is opposed to the valley of the groove structure 32, while much amount of light is extracted at a place where the center of the light source is opposed to the inclined surface of the groove structure 32. Thus, even in the vicinity of the light incident surface, brightness distribution between the adjacent light sources is cancelled, and brightness is made uniform, hardly causing light and shade.

Accordingly, as compared to the comparison example, a larger interval between the point light sources can be ensured. Further, by using the point light sources having high brightness or increasing brightness according to driving conditions, the number of point light sources can be reduced. That is, irregular contrast in the vicinity of the light incident surface can be reduced at low cost without lowering entire brightness of the backlight device.

In the first embodiment, a plurality of light source blocks (A1 to A4, B1 to B4) including the plurality of point light sources are provided. As each of the light source blocks, a linear light source having a directivity characteristic of emitting light nearly perpendicularly to an entire outgoing surface along the longitudinal direction (Y-direction) may be adopted.

Figure 9A:
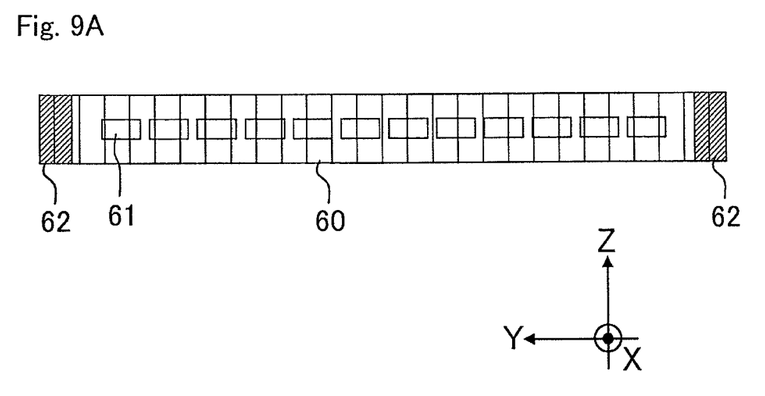
FIG. 9 is a schematic view of a light source block included in a liquid crystal display device according to the second embodiment.
Figure 9B:
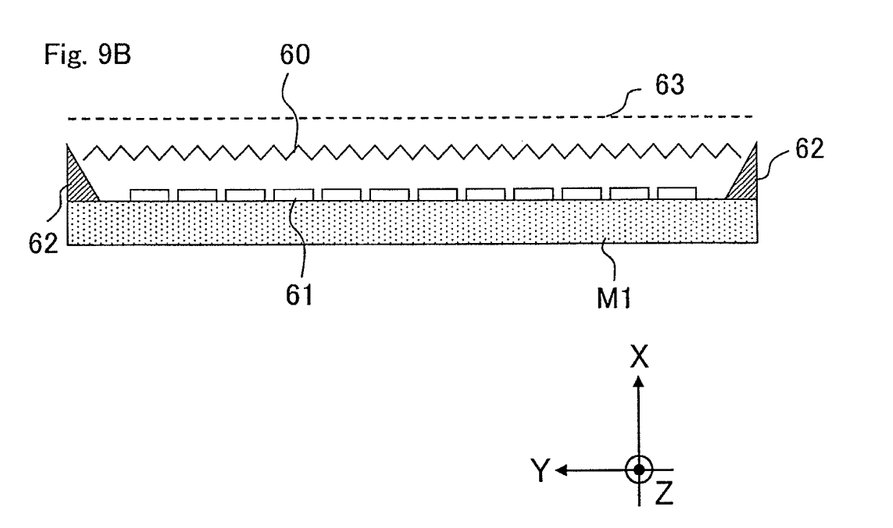

For example, as shown in FIGS. 9A and 9B, a plurality of aligned LED elements 61 are collectively sealed with a sealing body 60, and a front surface of the sealing body 60 is shaped like a groove such that light is emitted toward the outside (outgoing surface) of the sealing body at uniform brightness distribution to form a linear light source. FIG. 9A is a schematic view when the light source block is viewed from the light guide plate 10, and FIG. 9B is a schematic view when the light source block is viewed from above.

As shown in FIG. 9B, by arranging a reflector 62 on each longitudinal side surface of the light source block, light moving toward the side surfaces can be directed to an outgoing surface 63.

Figure 10A:
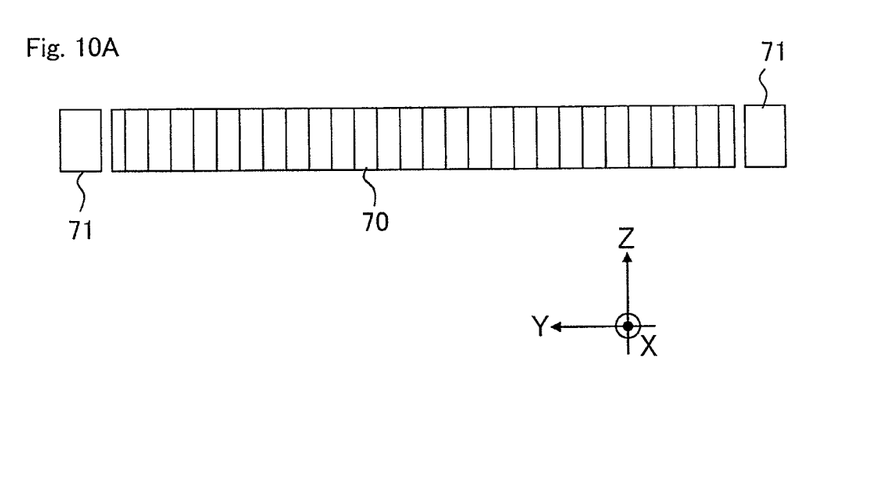
FIG. 10 is another schematic view of a light source block included in the liquid crystal display device according to the second embodiment.
Figure 10B:
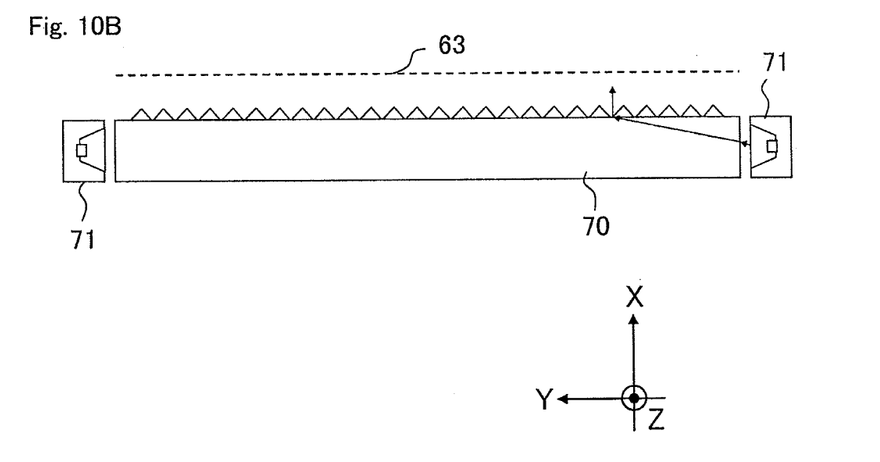

In another example, as shown in FIGS. 10A and 10B, a rod-like light-source light guide body 70 is formed as the light source block, and an LED light source 71 is arranged on each end of the light guide body 70 in the longitudinal direction (Y-direction). Then, a linear light source may be formed by processing, into grooved shape, one longitudinal side surface (XZ plane) of the light-source light guide body 70, which is opposed to the light guide plate 10. Similarly to FIG. 9B, a reference numeral 63 in FIG. 10B denotes the outgoing surface. The light-source light guide body 70 may be made of the same material as the light guide plate 10.

With the configuration as shown in FIGS. 9A and 9B and FIGS. 10A and 10B, since light can be emitted from the light source block to the light guide plate 10 substantially linearly, the effect of preventing light from moving into the adjacent display areas can be further achieved.

To improve the directivity characteristic of the light source block, a directivity characteristic control member (louver member) may be inserted between the light source block and the light guide plate 10.

Figure 11A:
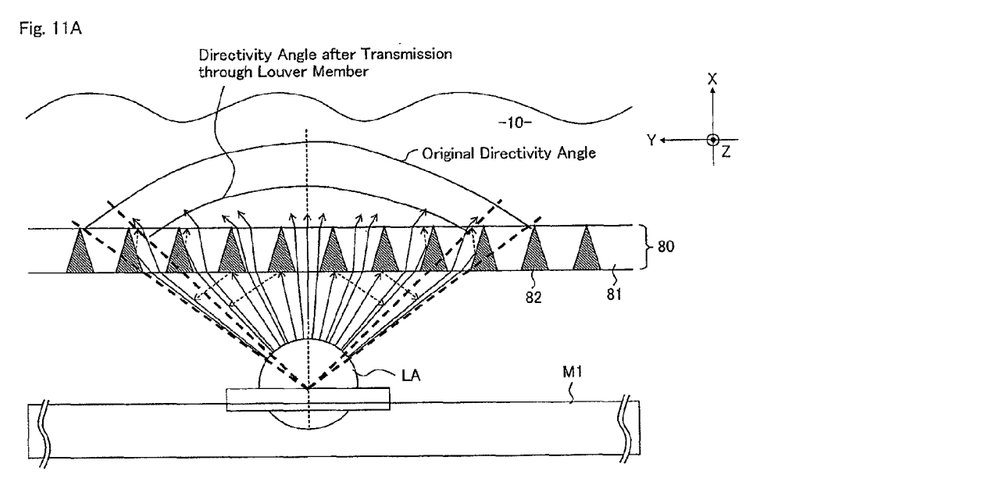
FIG. 11 is a schematic view of a directivity characteristic control member included in a liquid crystal display device according to the third embodiment.
Figure 11B:
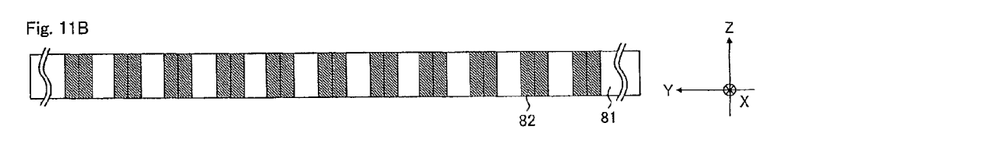

FIG. 11A is a schematic view showing a state where a directivity characteristic control member 80 is installed between the light source block and the light guide plate 10 when viewed from above. FIG. 11B is a schematic view of the directivity characteristic control member 80 when viewed in the light incident direction (X-direction).

The directivity characteristic control member 80 is shaped like a rod, and is formed by alternately arranging light transmission parts 81 and light shielding parts 82 (or light reflection parts) in the longitudinal direction (Y-direction). The light transmission parts 81 are arranged at regular intervals, and at a pitch smaller than the pitch and size of the LED light source LA (100 to 200 μm). In an example shown in FIG. 11, the light shielding part 82 is shaped like a triangle pole, and is arranged so as to be seen as a rectangular shape in the surface perpendicular to the X-direction (YZ plane) and seen as a triangular shape in the surface perpendicular to the Z-direction (XY plane). Among side surfaces of the triangle pole, a side surface having a side constituting a leg of the triangle is in contact with the light transmission part 81.

Similarly to the light guide plate 10, the directivity characteristic control member 80 is made of acrylic resin or polycarbonate resin, and is formed by embedding a member, to which a light diffusion filler, a coloring material, and the like are added, into places where the light shielding parts 82 are to be formed.

Figure 11C:
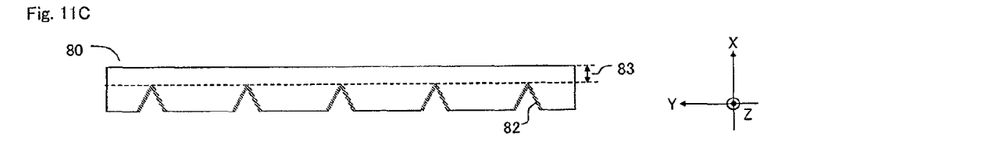

According to another method, as shown in FIG. 11C, the inside of the light shielding parts 82 is made hollow, and a light reflective film is formed on the surface in contact with the light transmission parts 81. In this case, to keep the shape of the directivity characteristic control member, a connecting part 83 by which the light transmission parts 81 are connected to each other is formed, resulting in that hollows in the light shielding parts 32 form grooves in the rod-like light transmission member.

With such a configuration, light moving from the LED light source LA in a diagonal direction (direction having an angle with respect to the X-direction) is likely to impinge on the light shielding parts 82, and is attenuated by being reflected or absorbed thereat. That is, as compared to the case where the directivity characteristic control member 80 is not provided, the directivity angle that directs light toward the light guide plate 10 can be decreased. Light moving substantially in parallel to the X-direction moves as it is to the light guide plate 10 through the light transmission parts 81.

Figure 12A:
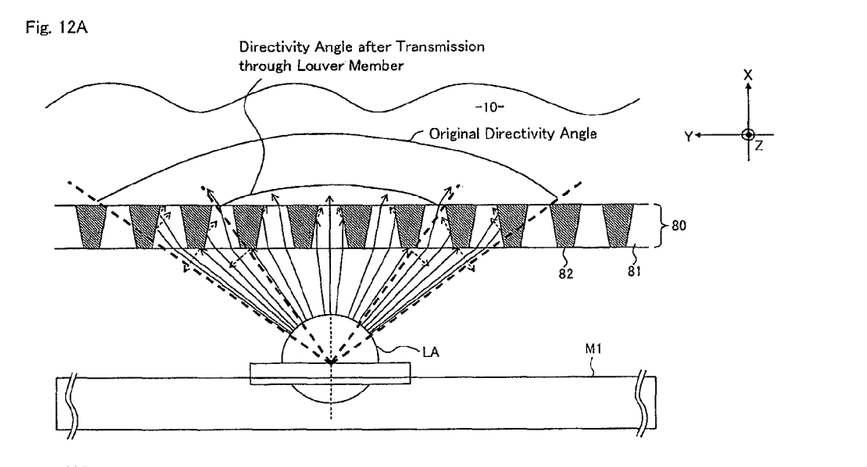
FIG. 12 is another schematic view of a directivity characteristic control member included in the liquid crystal display device according to the third embodiment.
Figure 12B:
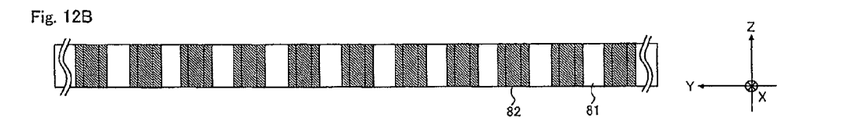
Figure 12C:
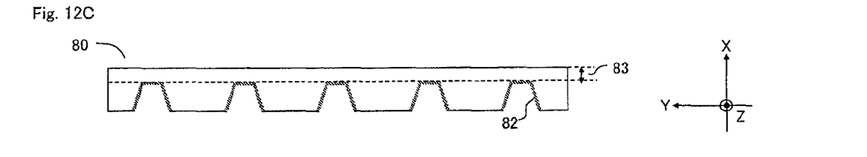

As shown in FIGS. 12A to 12C, the same effect can be achieved by light shielding parts each shaped like a trapezoidal column. FIG. 12A is a schematic view showing a state where the directivity characteristic control member 80 is installed between the light source block and the light guide plate 10 when viewed from above, and FIG. 12B is a schematic view showing the directivity characteristic control member 80 when viewed in the light incident direction (X-direction).

With the configuration shown in FIG. 12A, the width of the light shielding part 82 is larger as it comes closer to the light guide plate 10. As a result, a ratio of light projected to the light shielding parts 82 to light emitted from the LED light source LA in the diagonal direction (direction having an angle with respect to the X-direction) increases, and such light is hardly transmitted toward the light guide plate 10. As a result, light moving substantially in parallel to the X-direction is projected to the light guide plate 10, thereby further increasing the effect of preventing light from entering into the adjacent lighting areas.

Similarly to FIG. 11C, each of the hollow parts may be shaped like a trapezoidal column (refer to FIG. 12C).

In each of the above-mentioned embodiments, it is assumed that a pair of light source blocks opposed to each other across the light guide plate 10 are lighted on/off at the same time. On the contrary, in this embodiment, the pair of opposed light source blocks are independently controlled to be lighted on/off.

Specifically, in FIG. 1A, the light source blocks A1 and B1 are lighted at different timings. The same also applies to A2 and B2, A3 and B3, and A4 and B4. At this time, the light source blocks (A1 to A4) arranged on the board M1 have a left region from the center of the light guide plate 10 in the X-direction as the lighting area, and the light source blocks (B1 to B4) arranged on the board M2 have a right region from the center as the lighting area. In this manner, the display area is divided into eight, and minute local dimming can be driven by adjusting the LED light amount for each region.

In each of the above-mentioned embodiments, the light source blocks are provided on both side surfaces across the light guide plate 10, and light is incident onto the light guide plate 10 from the both directions. Alternatively, the light source block may be provided on only one side surface. With such a configuration, the effect of the present invention can also be achieved similarly to each of the above-mentioned embodiments.

The invention claimed is:

1. A liquid crystal display device comprising:
a liquid crystal panel; and
a backlight device including a rectangular light guide plate in plan view, and a light source unit emitting light toward a light incident surface corresponding to a side surface of the light guide plate, the light source unit being configured by a plurality of light source blocks arranged in a first direction parallel to the light incident surface and perpendicular to the light guide plate in a thickness direction, wherein
the light guide plate includes a groove structure for taking out light upward on its front surface opposed to a back surface of the liquid crystal panel, and a dot pattern for scattering light on its back surface, and
the groove structure has a plurality of stripe-like grooves extending in a second direction perpendicular to the light incident surface of the light guide plate, and a ridge extending in the second direction is formed at a portion sandwiched between the two adjacent grooves.

2. The liquid crystal display device according to claim 1, wherein a valley of each groove is positioned at the same level as or above a side surface of the light source unit, which is opposed to the light incident surface of the light guide plate.

3. The liquid crystal display device according to claim 1, wherein the dot pattern is distributed more densely with increasing distance from the light incident surface of the light guide plate along the second direction.

4. The liquid crystal display device according to claim 1, wherein
a directivity characteristic control member for controlling a directivity angle of light incident onto the light guide plate from the light source blocks is provided between the light source blocks and the light guide plate, and
the directivity characteristic control member is formed by continuously arranging a light transmission part and a light shielding part alternately in the first direction.

5. The liquid crystal display device according to claim 4, wherein the directivity characteristic control member is formed so as to continuously arrange the light transmission part and the light shielding part alternately in the first direction in a first region closer to the light source blocks than a predetermined position, and so as to be optically transparent as a whole in a second region closer to the light guide plate than the predetermined position.

6. The liquid crystal display device according to claim 4, wherein
the light source block has a plurality of LED elements arranged in the first direction, and
the directivity characteristic control member has a pitch between the light shielding parts that is smaller than a pitch between the LED elements.

7. The liquid crystal display device according to claim 4, wherein the directivity characteristic control member has a pitch between the light shielding parts that becomes smaller with decreasing distance from the light source blocks along the second direction.

8. The liquid crystal display device according to claim 1, wherein
the light source block has a plurality of LED elements arranged in the first direction, and the plurality of LED elements are integrally sealed together with a sealing body having optical transparency, and
the sealing body has a plurality of stripe-like grooves extending in parallel to the thickness direction of the light guide plate, on a surface opposed to the light incident surface of the light guide plate.

9. The liquid crystal display device according to claim 1, wherein
the light source block includes a rod-like light-source light guide body arranged by having one side surface opposed to the light incident surface of the light guide plate, and a pair of LED light sources arranged with the light-source light guide body interposed therebetween, so as to be opposed to two side surfaces of the light-source light guide body perpendicular to the side surface of the light-source light guide body opposed to the light incident surface of the light guide plate, and the light-source light guide body has a plurality of stripe-like grooves extending in parallel to the thickness direction of the light guide plate, on the surface opposed to the light incident surface of the light guide plate.

10. The liquid crystal display device according to claim 1, wherein a cross section in the first direction of the groove of the light guide plate has a smallest width at a valley thereof.

11. The liquid crystal display device according to any one of claim 1, wherein an angle formed by two inclined surfaces forming the groove is 88° or more and 98° or less.

12. The liquid crystal display device according to any one of claim 1, wherein the second direction corresponds to a scanning direction of the liquid crystal panel.

* * * * *